(12) United States Patent
Gregoire

(10) Patent No.: US 7,374,298 B2
(45) Date of Patent: May 20, 2008

(54) LASER BEAM DUMP

(75) Inventor: James Glen Gregoire, Orlando, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/989,169

(22) Filed: Nov. 15, 2004

(65) Prior Publication Data

US 2006/0103938 A1    May 18, 2006

(51) Int. Cl.
G02B 27/00 (2006.01)
(52) U.S. Cl. .................... 359/614; 359/601
(58) Field of Classification Search ........... 359/601, 359/614
See application file for complete search history.

(56) References Cited

U.S. PATENT DOCUMENTS

| | | | |
|---|---|---|---|
| 4,464,115 A | 8/1984 | Simpson et al. | |
| 4,511,216 A | 4/1985 | Hsu et al. | |
| 5,073,913 A | 12/1991 | Martin | |
| 5,221,977 A | 6/1993 | Leib et al. | |
| 6,220,715 B1 | 4/2001 | Fischer et al. | |
| 6,497,490 B1 | 12/2002 | Miller et al. | |
| 2002/0184950 A1 | 12/2002 | Kepler et al. | |
| 2003/0214721 A1* | 11/2003 | Poole | 359/614 |
| 2004/0022296 A1 | 2/2004 | Sukhman et al. | |
| 2004/0182929 A1 | 9/2004 | Aoshime et al. | |

FOREIGN PATENT DOCUMENTS

| | | |
|---|---|---|
| EP | 0932227 A2 | 7/1999 |
| JP | 01146386 A | 6/1989 |
| JP | 05104278 | 4/1993 |

* cited by examiner

Primary Examiner—Joshua L Pritchett
(74) Attorney, Agent, or Firm—Alan G. Towner, Esq.; Pietragallo Gordon Alfano Bosick & Raspanti, LLP

(57) ABSTRACT

A laser beam dump dissipates laser energy. The laser dump includes a cradle for holding the laser and an open cavity lined with a laser energy absorbing material. Laser emissions are directed from the laser into the laser dump cavity where the laser energy is dissipated.

18 Claims, 2 Drawing Sheets

LASER BEAM DUMP

GOVERNMENT CONTRACT

The United States Government has certain rights to this invention pursuant to Contract No. N61331-00-C-0022 awarded by the Department of Navy.

FIELD OF THE INVENTION

The present invention relates to a laser dump which absorbs laser energy.

BACKGROUND INFORMATION

Laser systems often require reshaping of the laser beam. Some of the rays of the laser beam may be separated or stripped from the beam of interest and the energy contained therein must be safely dissipated. In high power laser systems, such energy is substantial and the construction of a suitable heat absorbing device, commonly known as a laser dump, can present significant problems.

Many conventional laser dumps use a liquid coolant to absorb the incident radiant energy to keep the temperature of the dump material within allowable working limits. However, liquid cooling requires complex cooling channel networks and associated piping connections for the coolant. To increase the heat transfer rate, the coolant is usually forced through the cooling channels at a very high velocity under great pressure, which necessitates the use of a high pressure pump. U.S. Pat. Nos. 4,267,523 and 4,271,396 disclose laser dumps which utilize cooling fluids.

Other types of conventional laser dumps utilize reflective surfaces to control energy dissipation. One such design directs laser energy to a pointed reflective surface which reflects the energy to a hemispherical absorber. However, this design may result in excessive heat build up at the apex of the reflector. Another laser dump which utilizes reflective surfaces is disclosed in U.S. Pat. No. 4,511,216. This design controls the angles at which the beam is introduced to an internal cylindrical surface, and provides reflective and absorbing zones.

SUMMARY OF THE INVENTION

An aspect of the present invention is to provide a laser beam dump comprising a cavity lined with a laser beam absorbing material, and a cradle for receiving a laser such that laser beam emissions from the laser are directed into the cavity and are contained within the cavity.

Another aspect of the present invention is to provide a laser beam dump system comprising a laser, and a laser beam dump positioned adjacent to the laser for accepting laser beam emissions from the laser, the laser beam dump comprising a cavity lined with a laser beam absorbing material and a cradle structured and arranged to receive the laser.

A further aspect of the present invention is to provide a method of dissipating laser energy. The method comprises mounting the laser on a laser beam dump and directing a laser fan beam from the laser into the laser beam dump, wherein the laser beam dump includes a cavity lined with a laser beam absorbing material and a cradle for receiving the laser.

These and other aspects of the present invention will be more apparent from the following description.

DETAILED DESCRIPTION

Figure 1:
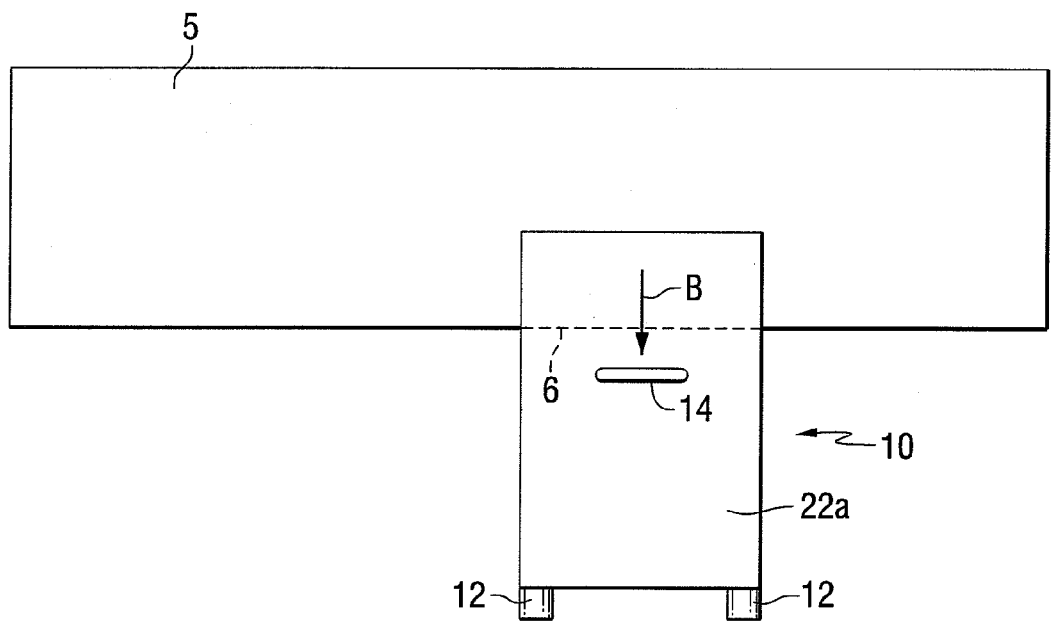
FIG. 1 is a partially schematic side view of a laser mounted on a laser beam dump in accordance with an embodiment of the present invention.

FIG. 1 illustrates a laser beam dump system in accordance with an embodiment of the present invention. The system includes a laser 5 which may be any conventional laser such as a neodymium: YAG type, Class 1, 2, 3a, 3b or 4 laser. The laser 5 may be a high power laser having a fan beam output, e.g., with an output level of less than 40 Watts. The laser 5 is positioned over the laser beam dump 10 in such a manner that a portion of the laser energy B generated by the laser 5 is emitted from a region 6 of the laser into the laser beam dump 10.

Figure 2:
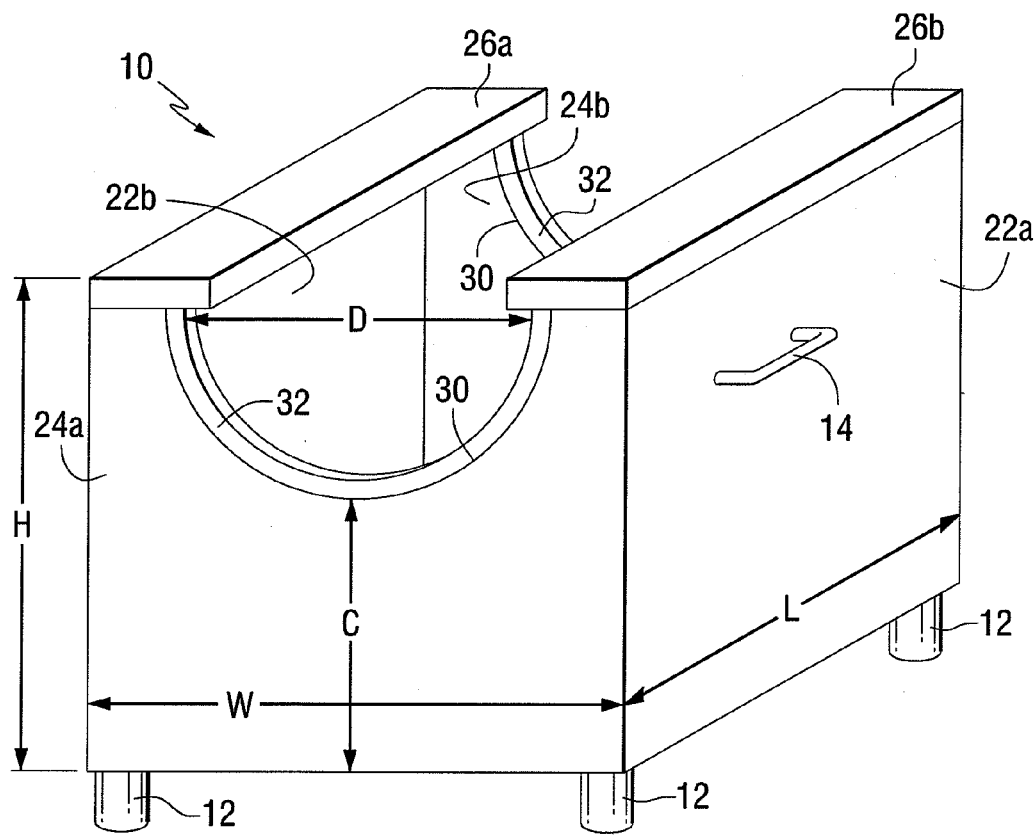
FIG. 2 is an isometric view of a laser beam dump in accordance with an embodiment of the present invention.

As shown in FIGS. 1 and 2, the laser beam dump 10 includes feet 12 which may be height-adjustable, e.g., from 0.5 to 3 inches. The laser beam dump 10 also includes side handles 14 which may be used to transport and adjust the orientation of the laser beam dump 10.

As shown in FIG. 2, the laser beam dump 10 includes opposing side walls 22a and 22b, and opposing front 24a and back 24b walls. Top edge portions 26a and 26b may be fastened by any suitable means such as mechanical fasteners or adhesives to the side walls 22a and 22b and/or the front and back walls 24a and 24b. A semicircular cradle 30 is formed in the front wall 24a and back wall 24b. A resilient sealing or padding strip 32 lines the cradle 30.

As shown in FIG. 2, the laser beam dump 10 has a height H of any suitable dimension, for example, from about 1 to about 3 feet. The width W of the laser beam dump 10 may be, for example, from about 1 to about 3 feet. The length L of the laser beam dump 10 may be, for example, from about 6 inches to about 2 feet. The cradle 30 has a diameter D which may vary depending upon the dimensions of the laser 5. For example, the diameter D of the cradle 30 may be from about 6 inches to about 3 feet. The shape of the cradle 30 shown in FIG. 2 is generally semicircular, however, the cradle 30 may have any other suitable shape such as square, rectangular or curved, depending on the geometry of the laser to be held by the cradle. The bottom of the cradle 30 is located at a height C from the base of the laser beam dump 10, which may range from about 6 inches to about 3 feet. The above-noted dimensions may be adjusted depending on the type and configuration of the laser.

Figure 3:
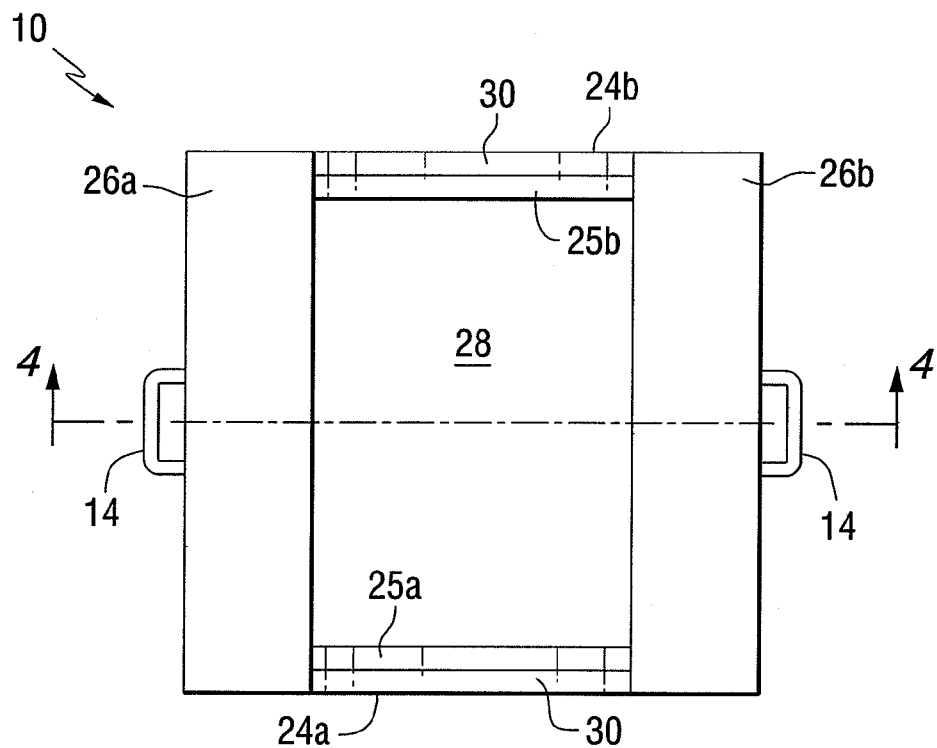
FIG. 3 is a top view of the laser beam dump of FIG. 2.

FIG. 3 is a top view of the laser beam dump 10 showing its internal cavity 28. In accordance with a preferred embodiment of the present invention, the cavity 28 is generally rectangular. Furthermore, the cavity 28 preferably does not include mirrors or other reflective surfaces for contacting the incoming laser beam. The cavity 28 has a suitable laser absorbing internal surface area, e.g., from about 1 $m^2$ to about 2 $m^2$. The cavity 28 has a suitable volume, e.g., from about 0.5 to about 0.75 $m^3$.

Figure 4:
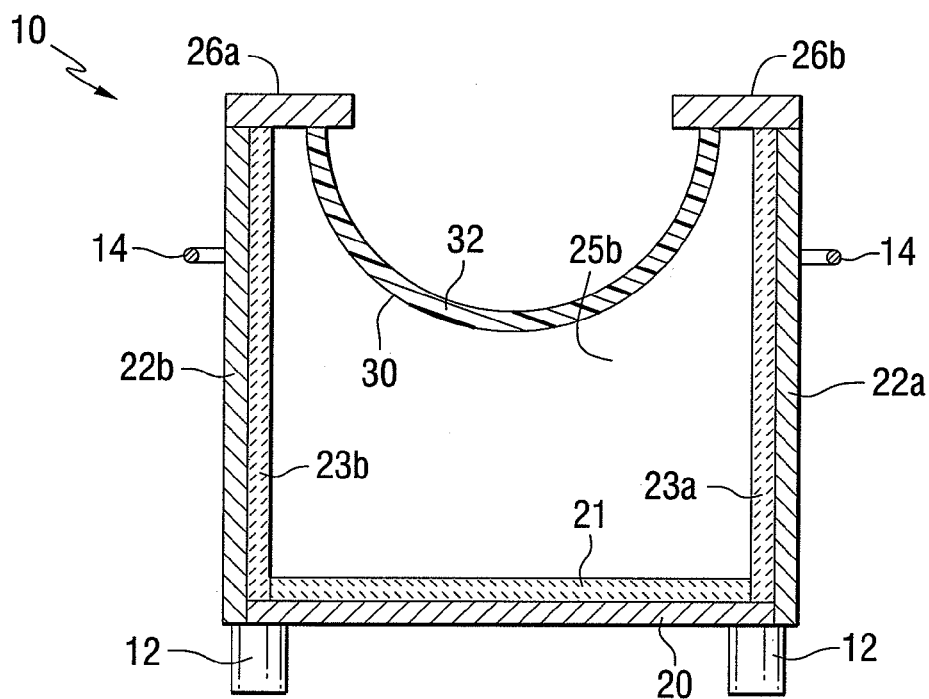
FIG. 4 is a sectional view taken through line 4-4 of FIG. 3

As shown in FIGS. 3 and 4, the cavity 28 of the laser beam dump 10 is lined with a laser absorbing material. The cavity may be partially lined or fully lined with the absorbing material. In the embodiment shown in FIGS. 3 and 4, the side walls 22a and 22b are lined with absorbing panels 23a and 23b, and the front and back walls 24a and 24b are also lined with absorbing panels 25a and 25b. As shown in FIG. 4, the base 20 of the laser beam dump 10 is lined with a laser beam absorbing panel 21.

The components of the laser beam dump 10 may be made of any suitable materials. For example, the side walls 22a and 22b, front wall 24a, back wall 24b, top edges 26a and 26b and base 20 may be made of plywood, sheet metal and/or plastic. The absorbing liners 23a, 23b, 25a, 25b and 21 may be made of any suitable laser beam energy absorbing material such as concrete wall board or other special laser absorbing material. For example, the laser beam energy absorbing material may be wall board sold under the designation Durock by USG Co. The resilient strips 32 may be made of any suitable material such as rubber weather stripping or plastic moulding.

The following example is intended to illustrate various aspects of the present invention, and is not intended to limit the scope of the invention.

EXAMPLE

A Class 4 laser fan beam comprising an environmentally sealed pod housing, environmental control unit and power supplies is positioned above or laser beam dump as shown in FIGS. 1-4. The laser beam dump has a height H of 25.5 inches, a width W of 26 inches, and a length L of 12 inches. The semicircular cradle has a diameter D of 20 inches and is elevated a height C of 15.5 inches from the base of the laser beam dump. The sides, front, back, base and top edges are made of ¾ inch thick plywood lined with ½ inch thick cement wall board sold under the designation Durock. The semicircular cradle is lined with rubber weather strip to protect the surface of the laser/pod housing from scratches and to protect against laser light leakage through the seam interface.

The laser and laser beam dump are operated as follows. The laser is mounted internal to the pod housing which is supported (suspended) by a special work stand, or in this case by the stores mounting structure of a helicopter. During the conduct of the test, the laser fan beam must be captured and contained without posing a health risk to test personnel or causing damage to assets or equipment. The laser beam dump is positioned under the pod at the appropriate region to capture laser energy B at the laser output port. If desired, a calorimeter can also be installed internal to the laser beam dump to enable measurements to be taken of the actual laser output power. After installation of the laser beam dump, height adjustments can be made to ensure a tight fit between the cradle 30 and the laser/pod surface 6 at which point the test may begin. Testing is performed without any anomalies for long durations, no laser light is released and no significant heating is experienced.

Whereas particular embodiments of this invention have been described above for purposes of illustration, it will be evident to those skilled in the art that numerous variations of the details of the present invention may be made without departing from the invention as defined in the appended claims.

The invention claimed is:

1. A laser beam dump comprising:
   opposing side walls and opposing front and back walls defining a cavity at least partially lined with a laser beam absorbing material; and
   a cradle formed in the front and back walls structured and arranged to receive and support a laser such that at least a portion of laser beam emissions generated from the laser are directed into the cavity.

2. The laser beam dump of claim 1, wherein the cradle substantially conforms to a shape of the laser.

3. The laser beam dump of claim 1, wherein the cradle comprises a resilient strip for sealing the cradle against the laser.

4. The laser beam dump of claim 1, wherein the cradle is substantially semi-circular.

5. The laser beam dump of claim 1, wherein the laser beam absorbing material is structured and arranged to receive the laser beam emissions directly from the laser with no prior reflection of the laser beam emissions inside the cavity.

6. The laser beam dump of claim 1, wherein the laser beam absorbing material fully lines the cavity.

7. The laser beam dump of claim 1, wherein the laser beam absorbing material comprises concrete wall board.

8. The laser beam of dump claim 1, wherein the laser beam comprises a fan beam.

9. A laser beam dump system comprising:
   a laser which generates laser beam emissions; and
   a laser beam dump positioned adjacent to the laser for accepting at least a portion of the laser beam emissions from the laser, the laser beam dump comprising opposing side walls and opposing front and back walls defining a cavity at least partially lined with a laser beam absorbing material and a cradle formed in the front and back walls structured and arranged to support the laser.

10. The laser beam dump system of claim 9, wherein the cradle substantially conforms to a shape of the laser.

11. The laser beam dump system of claim 9, wherein the cradle comprises a resilient strip for sealing the cradle against the laser.

12. The laser beam dump system of claim 9, wherein the cradle is substantially semi-circular.

13. The laser beam dump system of claim 9, wherein the laser beam absorbing material is structured and arranged to receive the laser beam emissions directly from the laser with no prior reflection of the laser beam emissions inside the cavity.

14. The laser beam dump system of claim 9, wherein the laser beam absorbing material fully lines the cavity.

15. The laser beam dump system of claim 9, wherein the laser beam absorbing material comprises concrete wall board.

16. The laser beam dump system of claim 9, wherein the laser beam comprises a fan beam.

17. A method of dissipating laser energy comprising:
   mounting and supporting a laser on a laser beam dump;
   generating laser beam emissions from the laser; and
   directing at least a portion of the laser beam emissions from the laser into the laser beam dump, wherein the laser beam dump comprises opposing side walls and opposing front and back walls defining a cavity lined with a laser beam absorbing material and a cradle formed in the front and back walls for holding and supporting the laser.

18. The method of claim 17, wherein the laser beam is directed toward the laser beam absorbing material with no prior reflection inside the cavity.

* * * * *